United States Patent
Gee et al.

(10) Patent No.: US 9,731,650 B2
(45) Date of Patent: Aug. 15, 2017

(54) ENHANCED SOUND GENERATION FOR QUIET VEHICLES WITH VEHICLE-TO-VEHICLE COMMUNICATION CAPABILITIES

(71) Applicant: Continental Automotive Systems, Inc., Auburn Hills, MI (US)

(72) Inventors: Robert Allen Gee, Lake Barrington, IL (US); Shafer Burch Seymour, Bartlett, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/934,274

(22) Filed: Nov. 6, 2015

(65) Prior Publication Data

US 2017/0129398 A1   May 11, 2017

(51) Int. Cl.
| | | |
|---|---|---|
| B60Q 1/00 | (2006.01) |
| B60Q 5/00 | (2006.01) |
| B60Q 1/54 | (2006.01) |
| G01S 13/08 | (2006.01) |
| H04N 7/18 | (2006.01) |
| H04B 7/212 | (2006.01) |

(52) U.S. Cl.
CPC ............ B60Q 5/008 (2013.01); B60Q 5/006 (2013.01)

(58) Field of Classification Search
CPC ........... B60Q 5/008; B60Q 5/006; B60Q 9/00
USPC ................................ 340/425.5, 438, 466, 435
See application file for complete search history.

(56) References Cited

U.S. PATENT DOCUMENTS

| | | | |
|---|---|---|---|
| 8,958,947 B2 * | 2/2015 | Inakazu ................. | B60Q 5/008 340/435 |
| 9,150,153 B2 * | 10/2015 | Konet ..................... | B60Q 5/008 |
| 2010/0100268 A1 * | 4/2010 | Zhang .................... | B60W 30/09 701/25 |
| 2010/0228434 A1 * | 9/2010 | Leyerle .................. | B60Q 5/008 701/36 |
| 2011/0199199 A1 | 8/2011 | Perkins | |
| 2013/0158795 A1 | 6/2013 | Hahne | |
| 2014/0070980 A1 * | 3/2014 | Park ........................ | G01S 19/42 342/118 |
| 2015/0053066 A1 * | 2/2015 | Hampiholi ............ | B60W 50/14 84/602 |
| 2015/0057931 A1 | 2/2015 | Pivonka | |
| 2015/0127191 A1 | 5/2015 | Misra et al. | |
| 2015/0203031 A1 | 7/2015 | Arita et al. | |
| 2016/0257248 A1 * | 9/2016 | Lisseman ................. | B60Q 9/00 |
| 2016/0267335 A1 * | 9/2016 | Hampiholi ......... | G06K 9/00845 |

FOREIGN PATENT DOCUMENTS

| | | |
|---|---|---|
| DE | 102009012614 A1 | 9/2010 |
| WO | 2014/162513 A1 | 10/2014 |

OTHER PUBLICATIONS

International Search Report and Written Opinion dated Jan. 30, 2017 from corresponding International Patent Application No. PCT/US2016/055174.

* cited by examiner

Primary Examiner — Jack K Wang

(57) ABSTRACT

Two or more quiet vehicles traveling together sense each other and communicate to each other the condition of the respective drivers of the vehicles and announce their presence to pedestrians and other motorists using noise sounds. The characteristics of the emitted sounds are selected according to a level of threat presented by the quiet vehicles.

9 Claims, 4 Drawing Sheets

ENHANCED SOUND GENERATION FOR QUIET VEHICLES WITH VEHICLE-TO-VEHICLE COMMUNICATION CAPABILITIES

BACKGROUND

Battery powered and hybrid electric vehicles are quiet. Some of them are essentially silent. While such vehicles are fuel efficient and their reduced noise levels generally considered desirable, some pedestrians and some drivers of other types of vehicles are conditioned to listen for sounds of an internal combustion engine to determine whether a vehicle is approaching or nearby. When the sound of a conventionally-powered vehicle is not heard, pedestrians and other drivers often mistake the absence of such noise as an indication that no vehicles are approaching or nearby. Stated another way, quiet vehicles can sometimes be dangerous because of their quiet drive trains. Moreover, the safety hazard presented by quiet vehicles can be exacerbated when the driver of such a vehicle is physically or mentally impaired or distracted. A method and apparatus for enunciating or announcing the approach or presence of a group of quiet vehicles travelling together, one or more of which might be operated by an impaired driver, would be an improvement over the prior art.

DETAILED DESCRIPTION

As used herein, the term, "quiet vehicle" refers to a motor vehicle propelled by one or more electric motors. The term thus includes both hybrid-electric vehicles like the Toyota® Camry® and one hundred percent battery-powered vehicles like the Nissan® Leaf®.

A multiplexer is a device for selecting one input signal from a number of input signals and switching the information at or from a particular input to a single output.

The term "vital signs" refers to the pulse rate, respiratory rate, body temperature, and often blood pressure of a person.

The term "noise" refers to an audible sound that attracts attention. A generated noise can thus be an audible sound that is generated with or without an agreeable musical quality or one that is either noticeably pleasant or unpleasant.

The term, "real time" refers to the actual time during which something takes place.

Figure 1:
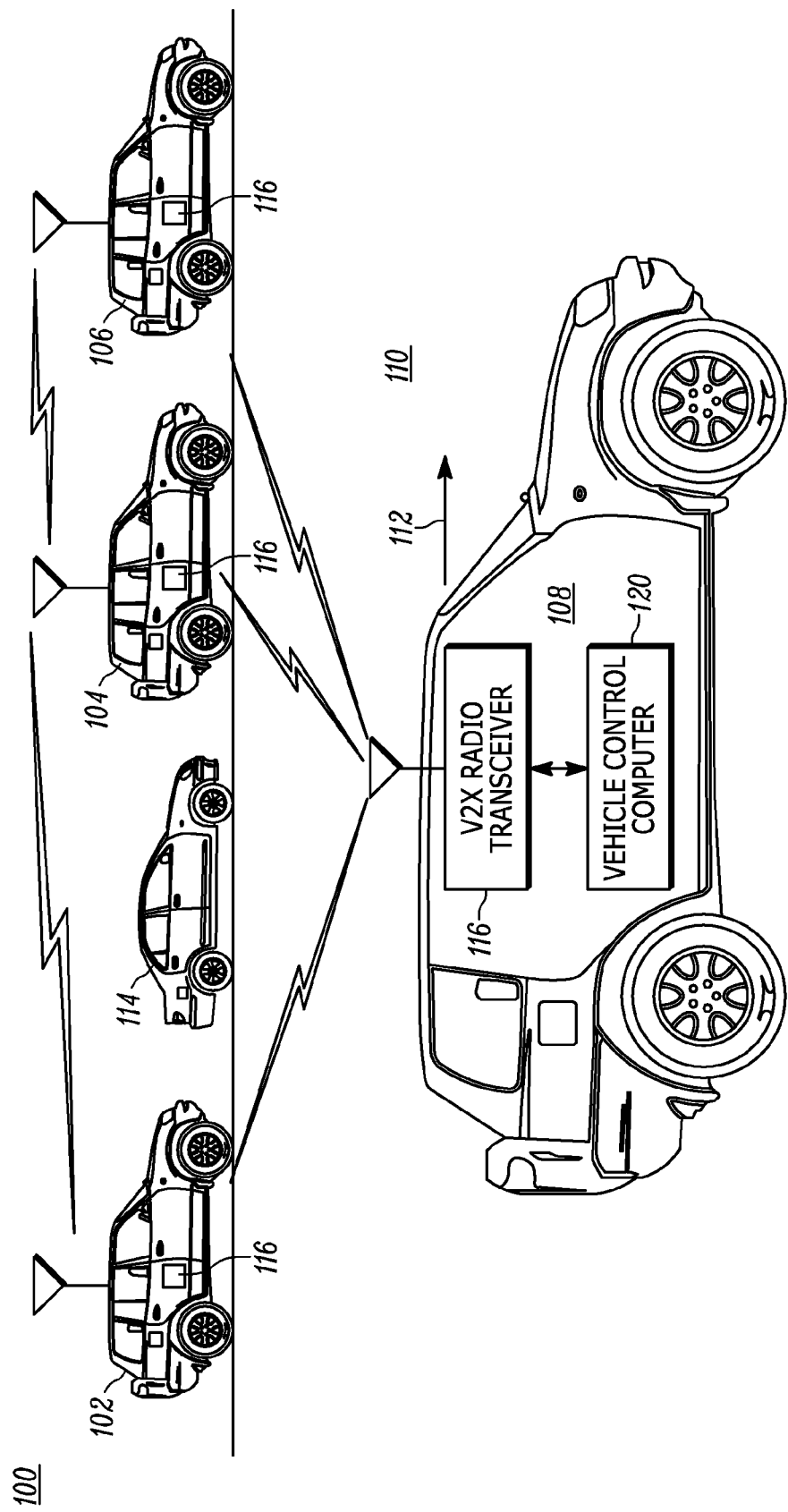
FIG. 1 depicts several vehicles moving together along a roadway.

FIG. 1 depicts four quiet vehicles 102, 104, 106 and 108 moving together at essentially the same speed along a roadway 110 in the same direction 112. A fifth vehicle 114 which is "inside" the pack of quiet vehicles 102, 104, 106 and 108 also moves with the quiet vehicles 102, 104, 106 and 108 but is propelled instead by a conventional internal combustion engine and is therefore not considered to be a quiet vehicle.

As shown in the figure, the quiet vehicles 102, 104, 106 and 108 are relatively close to each other, i.e. within a few car lengths of each other. All of the vehicles depicted in FIG. 1 are thus considered herein to be "proximate" to each other as they move.

As used herein, the term, point-to-point communications refers to communications conducted over or via a communication link that exists directly between two or more radios or transceivers.

In a preferred embodiment, each quiet vehicle 102, 104, 106 and 108 has a vehicle-to-vehicle radio transceiver 116, which is coupled to and controlled by a vehicle control computer 120. The vehicle-to-vehicle (V2V) radio transceivers 116 provide point-to-point communications between and among the quiet vehicles, enabling the quiet vehicles 102, 104, 106 and 108 to communicate wirelessly and directly with each other, bi-directionally when they are "proximate" to each other, i.e., within the transceiver's 116 signal range, typically up to about five hundred feet.

In a preferred embodiment the vehicle-to-vehicle radio transceivers 116 are embodied as WI-FI transceivers, compliant with the I.E.E.E. 802.11(a) or (b) or (g) or (n) standards or, WAVE transceivers, which are compliant with I.E.E.E. 802.11(p) standard, both of which are well known to be capable of providing two-way point-to-point wireless communications over distances up between zero feet up to about five hundred feet.

As described below, the vehicle control computer 120 of each vehicle is coupled to one or more driver vital sign sensors and vehicle control system sensors, i.e., sensors that detect the operation of various vehicle control systems and which generate signals representing those operations. The vehicle control computer 120 in each quiet vehicle is thus "configured" to know various operating characteristics of both a vehicle and the state of a person operating the vehicle. Since the vehicle-to-vehicle radio transceivers 116 are coupled to the computers 120, the transceivers in them enable the quiet vehicles 102, 104, 106 and 108 to exchange operating characteristics of the vehicles and the drivers' physical and mental states between and among themselves. By way of example, the first quiet vehicle 102 is provided with driver and vehicle information from the other quiet vehicles 104, 106 and 108. Driver information includes the driver's state of mind and physical condition. And, the computers 120 in the quiet vehicles identified by reference numerals 104, 106 and 108 are provided with information about the state of mind and physical condition of the driver of the first quiet vehicle 102. The vehicle control computer 120 in each vehicle thus has information about the states of mind and physical conditions of the drivers of the various other quiet vehicles within the signal range of the vehicle-to-vehicle radio transceivers in each vehicle.

Figure 2:
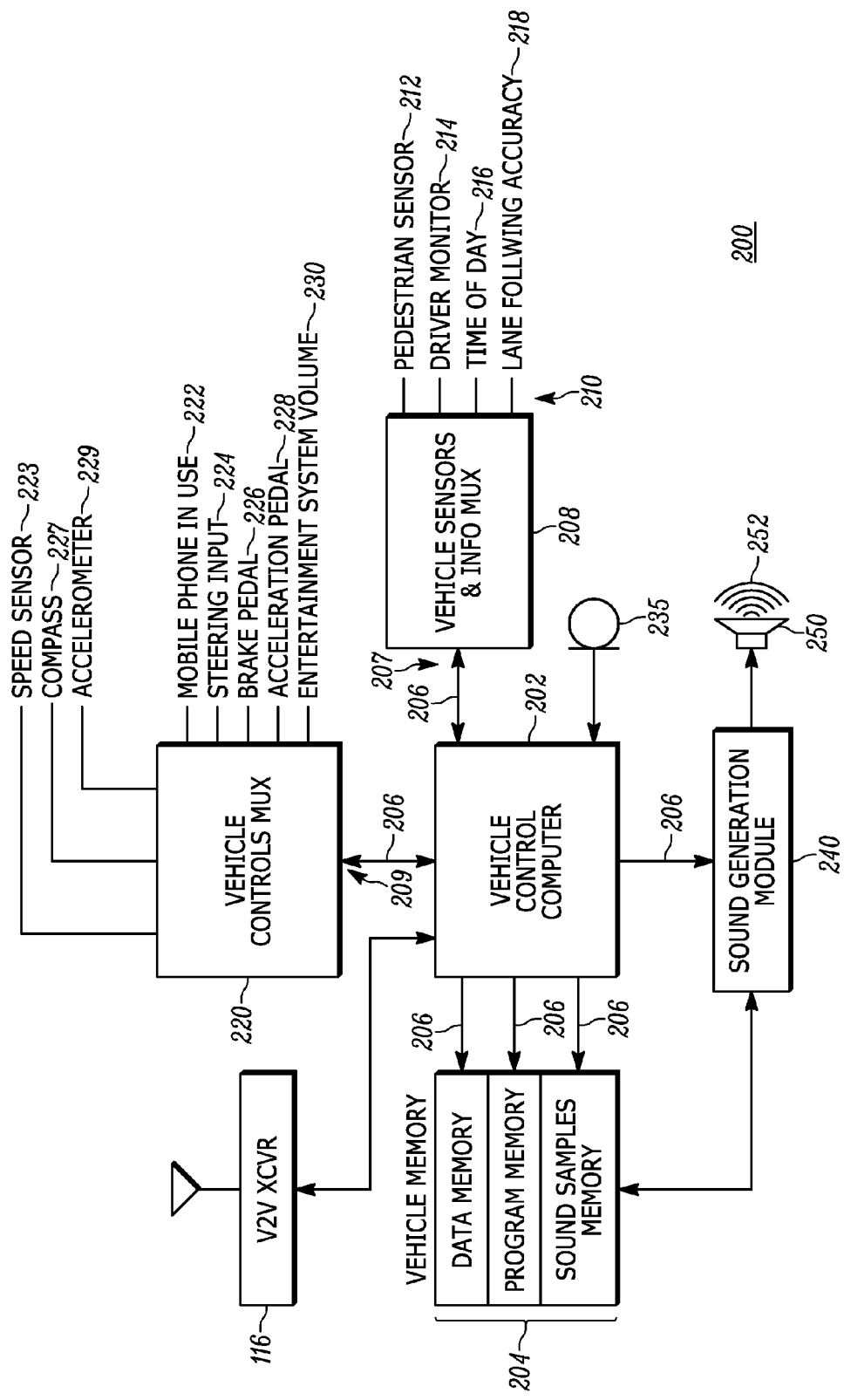
FIG. 2 is a block diagram of an apparatus for announcing the presence of a quiet vehicle responsive to a driver's impairment.

FIG. 2 is a block diagram of an apparatus 200 for announcing the approach or presence of a quiet vehicle to a pedestrian or other driver. The nature of the vehicle's announcement by the apparatus 200 is dependent upon or responsive to a driver's impairment level relative to impairments of drivers of other nearby quiet vehicles and whether there are pedestrians, cyclists, other vehicles and other objects in the pathway of the quiet vehicles traveling together.

The apparatus 200 comprises a computer 202 operatively coupled to a non-transitory memory device or devices 204 via a conventional bus 206, which is a set of electrically parallel conductors in a system that forms a main transmission path, well known in the computer art. Examples of non-transitory memory devices include semiconductor RAM, semiconductor ROM, semiconductor EPROM, magnetic and/or optical discs, et al., all of which are well known in the computer art.

In addition to being coupled to memory devices 204, the computer 202 is also coupled to a first conventional multiplexer 208. The single output 207 of the first multiplexer 208 can thus provide to the computer 202, various signals 210 input to the multiplexer inputs from multiple different types of sensors, not shown but well known to those of ordinary skill in the art and therefore omitted in the interest of brevity.

One of the sensors is a pedestrian sensor 212. It is coupled to the first multiplexer 208 and detects the presence of a human in front of or adjacent a motor vehicle by measuring one or more characteristics of a human, such as shape and surface temperature. One such sensor is available from Neurotechnology, which is a company located at Laisves Ave. 125A Vilnius, LT-06118, Lithuania. Such a sensor is also described in a publication available on line at http://www.prnewswire.com/news-releases/verilook-surveillance-30-sdk-identifies-faces-and-moving-objects-differentiates-pedestrians-from-other-moving-objects-in-video-surveillance-systems-279250992.html, which is incorporated herein by reference. See also, Shinya Saito and Takeki Ogitsu, "Face Detection-based System to Sense Pedestrians At High Risk of Collision," I.E.E.E. Computer Society, 2015, 6th International Conference on Intelligent Systems, Modeling and Simulation, pages 21-23, also incorporated herein by reference.

Distances between the vehicle and a detected human, cyclist, motor vehicle or other object can be measured using RADAR, SONAR or LIDAR, a prior art remote sensing technology that measures distance by illuminating a target with a laser and analyzing the reflected light, all of which are part of the pedestrian sensor 212. The pedestrian sensor 212 thus detects humans and provides signals indicating the presence of pedestrians, i.e., whether a human is walking, cyclists riding on motor-driven bicycles, cyclists riding on pedal-powered bicycles and provides signals that indicate the direction of their travel, including the direction that a curb-side pedestrian is facing, as well as the distance between them and the vehicle, in real time.

A plurality of such pedestrian sensors 212 distributed around each quiet vehicle 102, 104, 106 and 108 and directed away from each quiet vehicle in the same different direction on each vehicle enables the quiet vehicles 102, 104, 106 and 108 to collectively detect pedestrians as they might approach the vehicles from different directions. The pedestrian sensors also detect an approach of the vehicle toward a stationary pedestrian, building or other vehicle in real time.

As used herein, the term "vital signs" refers to the pulse rate, respiratory rate, body temperature, and often blood pressure of a person. Driver monitors 214 in each vehicle 102, 104, 106 and 108 measure a driver's pulse, respiration rate, body temperature, eye movement and head movement and provide quantitative information indicative of a driver's health, fatigue or agitation level and thus a quantitative measure of the driver's level of physical and mental impairment.

A driver's relative or actual impairment level at any time can be determined by comparing real time vital sensor data to a history of the same driver's vital signs, which are stored in the memory device 204. Being coupled to the first multiplexer 208, the vital signs sensors of each vehicle 102, 104, 106 and 108 can provide a driver's real time vital signs data to the computer 102 each vehicle for analysis and, using the vehicle-to-vehicle transceiver 116, distribute or send the same data to the other quiet vehicles travelling together for a comparison or determination of which driver of the pack of quiet vehicles 102, 104, 106 and 108 is most impaired.

A clock 216 or time of day sensor provides data representing the actual time of day when various events occur or conditions are detected, including their duration. Occurrences of various events and detections of various conditions, and their durations, are stored as the time they begin and the time at which they end, in the data portion of the vehicle memory 204 and thus enable historical analyses of events and conditions over time.

A lane sensor 218, also known in the art, detects when a vehicle drifts or crosses a lane line in real time and provides a signal indicative thereof to the multiplexer 208.

Signals from the various sensors provided to the multiplexer 208 are provided there through to the computer 202 via the bus 206, responsive to control signals sent to the multiplexer 208 from the computer 202. Stated another way, the computer 202 selects which sensor information to "read" by way of control signals sent to the multiplexer 208 from the computer 202 via the bus 206. Using the pedestrian sensor 212, the computer 202 is thus able to selectively detect humans, detect vehicles and other objects around the vehicle, measure distances between the vehicle and humans, vehicles and objects, sense various operations of the vehicle's control systems by the driver in real time, measure one or more "vital signs" of the driver in real time and compare the driver's real-time vital signs to various real-time operations of the vehicle's driving controls by the driver. Stated another way, the computer 202 is provided with information by which the computer 202 can determine whether the vehicle's quiet operation might present a safety threat to a human, a vehicle or other object in its path. The sharing of such a determination by multiple quiet vehicles 102, 104, 106 and 108 proximate to each other enables one or more of them to announce the approach of an impaired driver in one or more other vehicles.

Monitoring the drivers' operations of the vehicles, i.e., the drivers' physical manipulation of the vehicles' controls, is accomplished by way of a second multiplexer 220 coupled to each vehicle control computer 202 and which is referred to herein as a vehicle controls multiplexer 220 to which various vehicle operation sensors are coupled.

As with the first multiplexer, the second multiplexer has a single output 209 and several inputs, each of which is coupled to a different sensor for various vehicle controls. One vehicle control sensor is a mobile telephone or cell phone use detector/sensor 222. It provides signals to the second multiplexer 220 indicating whether a cell phone in the vehicle is in use. Cell phone use includes a conversation, text messaging, Internet browsing, playing back multimedia files and composing or reading e-mail messages.

A steering control input sensor 224 provides signals to the multiplexer 220 indicating the driver's operation of the vehicle's steering wheel, i.e., movement of the steering wheel around its axis of rotation. Signals from the steering control input sensor 224 can indicate whether the driver is correcting or changing the vehicle steering wheel position too quickly or excessively for the speed at which the vehicle is moving.

A brake pedal operation sensor 226, an accelerator pedal operation sensor 228 and an entertainment system volume sensor 230 provide corresponding signals indicative of the driver's brake pedal usage, accelerator pedal usage and the level or volume of audio output from the vehicle's infotainment system.

A vehicle speed sensor 223, a compass 227 and an accelerometer 229 provide corresponding information-bearing signals to the vehicle controls multiplexer 220. Data from those sensors 223, 227, 229 enable the computer 202 to determine the vehicle's speed, its direction or travel and whether the vehicle is turning, accelerating or decelerating, all in real time.

As with the vehicle sensor information multiplexer 208 the vehicle's second multiplexer 220 provides signals received by it from the various vehicle sensors to the computer 202, in real time, via signals sent to the second multiplexer from the computer 202 via the bus 206. The vehicle control computer 202 is thus able to selectively obtain information-bearing signals in real time, which are indicative of the driver's operation of the vehicle, including the driver's operation of a wireless communications device inside the vehicle. Sensor information provided to the first multiplexer 208 can thus be correlated to a driver's operation of a vehicle, as indicated by sensor information provided to the second multiplexer 220. A driver's operation of the vehicle can thus be correlated to the driver's mental and physical state or level of impairment.

The computer 202 is configured to read and execute program instructions stored in the non-transitory memory device 204, which when executed cause the computer 202 to read various signals from various sensors and quantitatively determine the degree or level by which the driver might be impaired physically or mentally. Stated another way, the computer 202 executes program instructions from memory 204, which enable the computer 202 to determine in real time the driver's state of mind or physical state from real-time measurements of one or more vital signs of the driver and real-time measurements of the driver's usage or operation of the vehicle driving controls responsive to the presence or absence of humans, vehicles or other objects in front of or near the vehicle, whether the vehicle is moving or stationary. The computer 202, its programming stored in memory 204 and the various sensors described above are thus considered to be a driver impairment determiner inasmuch as they are able to quantitatively measure a driver's state of mind and physical state, i.e., wellbeing.

Referring again to FIG. 2, a conventional microphone 235 is sized and arranged or "configured" to transduce sound waves outside the vehicle into measurable electrical signals. Electrical signals from the microphone are processed by the computer 202 under software control to provide a Fast Fourier analysis of ambient noise. Stated another way, the microphone 235 enables the computer 202 to sample audible sounds or sounds capable of being heard which are outside the vehicle, i.e. ambient noise, and provide a numeric representation of frequency and magnitude of various audio frequency components that make up or comprise the ambient noise.

In a preferred embodiment, program instructions inside the memory device 204 cause the vehicle computer 202 to generate an audio output signal embodied as one or more audio-frequencies, and provide such an audio signal to a sound generation module 240. The sound generation module 240 provides an audio frequency signal to an audio signal transducer 250, which is simply a loudspeaker 250. The characteristics of the generated audio noise signals 252 are such that the signals 252 emitted from the audio signal transducer 250 are made to be as distinguishable as possible.

The noise frequency components and their amplitudes are generated or selected by the computer 202 responsive to program instructions in order to make the generated noise signal 252 as distinguishable from ambient noise as might be possible but the selection of noise signal frequencies and noise signal frequency amplitudes also considers each driver's level of impairment, i.e., the impairment level of each driver of each quiet vehicle 102, 104, 106 and 108. By generating audio frequency signals at amplitudes not found in the ambient noise, the generated noise 252 from the loud speaker 250 is thus preferentially audible to pedestrians and vehicle drivers that might be proximate to the vehicle when the vehicle is being driven by an impaired driver. By selecting frequencies of a signal according to each driver's physical or mental state, pedestrians and other drivers can also be made aware of one or more drivers of quiet vehicles, who might pose a safety threat to them.

In the preferred embodiment, characteristics of the generated noise are selected under software control based upon each computer's determination of the mental or physical state of each driver of each vehicle. Those frequencies are adjusted by one or more of the computers to improve the likelihood that impaired drivers will be announced to pedestrians, cyclists and drivers of other motor vehicles nearby. In an alternate embodiment, a nominal 'here I am' noise is generated when none of the quiet vehicle drivers are impaired. In such a case, the noise, which can be one or more tones, is designed to alert the presence of the vehicles and not enhanced to inform of exacerbated danger from the group of vehicles.

In an alternate embodiment, digitized music and other types of sounds are stored as corresponding data files in the data memory portion 204. The vehicles' horns can also be used as noise sources.

Sounds stored in the vehicle memory 204 are selected for playback by the computer 202, according to varying needs to enunciate the quiet vehicles' approach. In such an alternate embodiment, sounds stored in the vehicle memory 204 are selected for playback by the computer 202 responsive to one or more of a driver's impairment level, the presence of pedestrians, cyclists, other vehicles and other objects, but also responsive to the vehicle's speed and the driver's operation of it.

In a preferred embodiment, the frequencies of the components of the noise generated by the computer 202 and their amplitudes are selected by program instructions in order to make the generated noise as distinguishable from ambient noise as might be possible. The level or degree of the noise's distinction from ambient noise also considers a driver's level of impairment.

By generating audio frequency signals at amplitudes not found in the ambient noise, the generated noise 252 from the loud speaker is thus preferentially audible to pedestrians and vehicle drivers that might be proximate to the vehicle when the vehicle is being driven by an impaired driver. By additionally selecting frequencies of a signal or the amplitudes of the frequencies according to a driver's physical or mental state, however, pedestrians and other drivers can also receive more advanced notice of a driver who might be a serious threat to their safety.

In a preferred embodiment the characteristics of the generated noise are selected under software control based upon the computer's determination of the driver's state of mind or physical state and adjusted to improve the likelihood that the impaired driver will be announced to pedestrians and other motor vehicles nearby. The characteristics of the generated noise are also selected according to where the vehicle is located in a group of quiet vehicles traveling together on a roadway and the state of mind and physical state of the drivers of those other nearby quiet vehicles.

Figure 3:
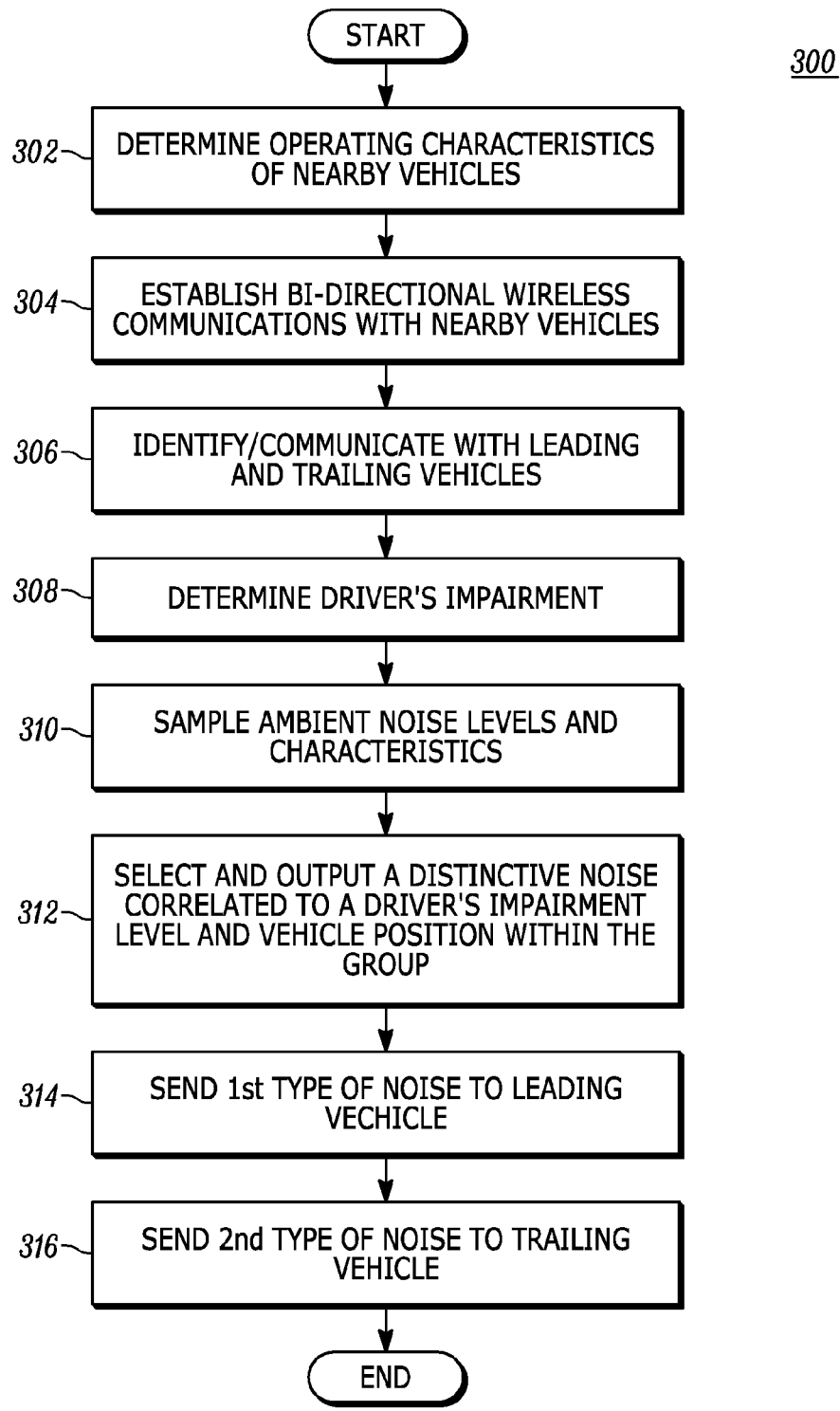
FIG. 3 is a flowchart depicting steps of a method for announcing the presence of a vehicle operated by a driver, the announcement being dependent upon the level of impairment of a driver and dependent on the location of the vehicle relative to other quiet vehicles.

FIG. 3 is a flowchart depicting steps of a method 300 of announcing the presence of several quiet moving vehicles proximate to each other as they move. In a first step 302, a quiet vehicle that is moving determines the presence, location and operating characteristics of other nearby quiet vehicles by way of a vehicle-to-vehicle transceiver, such as the vehicle-to-vehicle transceiver 116 depicted in FIG. 1 and described above, transmitting a beacon signal and/or listening for beacon signals transmitted by the vehicle-to-vehicle transceivers 116 in other quiet vehicles.

By way of example, determining whether quiet vehicles are nearby vehicles can be made simply by listening for V2V signals from quiet vehicles and establishing a communication channel. Determining whether a quiet vehicle is nearby is thus considered herein to be a determination of the characteristics of nearby vehicles. The first step of the method is therefore a determination of the characteristics of nearby vehicles, i.e., determining whether vehicles within about one hundred feet up to about five hundred feet are quiet vehicles having a vehicle-to-vehicle transceiver.

At a second step 304, bi-directional wireless communications are established between the quiet vehicles that are near each other. Such communications are readily established using Wi-Fi and other similar wireless communication protocols, all of which are well known in the art.

At step 306, one of the quiet vehicles travelling together, and in FIG. 1 the vehicle identified by reference numeral 108, identifies the leading and trailing vehicles travelling together, preferably using real-time location data obtained from global positioning navigation systems on board each vehicle. Such navigation systems are well known, nearly ubiquitous, and omitted from the figures for brevity.

In FIG. 1, the quiet vehicle identified by reference numeral 106 is travelling in the direction identified by reference numeral 110 and is at a location that is ahead of or in front of the other quiet vehicles 102, 104 and 108. The quiet vehicle identified by reference numeral 106 is thus considered herein to be the "leading" quiet vehicle.

Similarly the quiet vehicle identified by reference numeral 102 is travelling in the same direction identified by reference numeral 110 but is behind the other quiet vehicles 104, 106 and 108. It is thus considered to be the "trailing" or following vehicle.

At step 308 the impairment of each driver for each of the quiet vehicles 102, 104, 106 and 108 is determined by the vehicle control computer 120 in each quiet vehicle by the computer's reading or obtaining information from the various sensors depicted in FIG. 2. Determining the drivers' impairment levels is important as it affects the type of noise to be generated by one or more of the vehicles, if any, and determines which of the vehicle's will enunciate the generated noise.

In a preferred embodiment, the vehicle having the most severely impaired driver is selected as the vehicle from which a noise announcement of the quiet vehicle pack or caravan should be made. By way of example, in FIG. 1, if the quiet vehicle identified by reference numeral 108 has a driver that is determined to be more impaired than drivers of the other quiet vehicles 102, 104 and 106, a vehicle announcement noise is generated from the vehicle identified by reference numeral 108. In alternate embodiments, a leading vehicle or a trailing vehicle having the least impaired drivers can generate different noises to announce the leading and trailing vehicles of the caravan of quiet vehicles 102, 104, 106 and 108.

Still referring to FIG. 3, at step 310, the computer 120 in each quiet vehicle 102, 104, 106 and 108 samples the ambient noise relative to each vehicle using the aforementioned microphone and, measures both the frequencies and amplitude characteristics of the ambient noise using conventional digital processing and signal analysis techniques, preferably Fast Fourier analysis. Such analysis is well known in the art. Further description of it is therefore omitted in the interest of brevity.

At step 312, an announcing noise is formulated or selected by each vehicle's computer, and output from the vehicle's loud speaker if the vehicle is selected among the quiet vehicles 102, 104, 106 and 018 to announce their approach. The characteristics of the announcing noise produced by each vehicle 102, 104, 106 and 108 are chosen on a vehicle-by-vehicle basis in order to distinguish the announcing noise of each vehicle from any ambient noise detected and measured at step 310 by each vehicle. In one alternate embodiment, one or more of the vehicles' horns announce the approach of the vehicles 102, 104, 106 and 108.

Figure 4A:
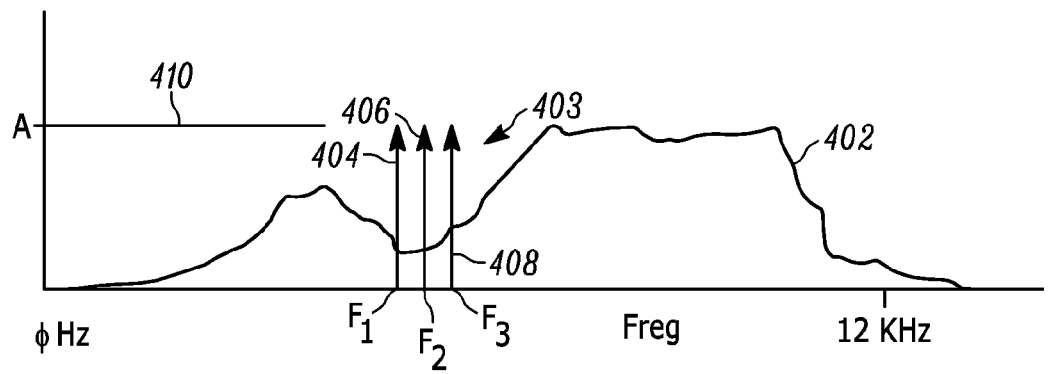
FIGS. 4A and 4B depict plots of audio frequency spectra of ambient noise and depicts three different frequency-signals, the frequencies and amplitudes of which are selected to be distinguishable from the ambient noise.

FIG. 4A depicts a plot of audio signals 402 that comprise ambient noise. A lull or notch 403 can be seen to exist between two frequencies identified by reference numerals F1 and F3. The notch 403 is essentially centered at third frequency, F2.

FIG. 4A shows three discreet frequencies F1, F2, and F3 identified by reference numerals 404, 406, and 408 respectively which are generated by the control computer 120 because of the relative quiet or reduced ambient noise level at those frequencies. The generated noise frequencies F1, F2, and F3 are thus considered herein to be more distinguishable from the ambient noise because they exist at a relative null or notch in the ambient noise 402 between about zero Hertz and about 12 Khz.

Referring again to FIG. 3, at step 314 a first type of noise is generated by the leading quiet vehicle or one of the leading quiet vehicles whenever there might be two leading vehicles substantially abreast of each other. At step 316, a second and different type of noise is generated by one of the trailing vehicles. The first and second noises are different from each other in order for a pedestrian to be able to demarcate by the emitted noises where the beginning and end of a train or caravan exist.

Figure 4B:
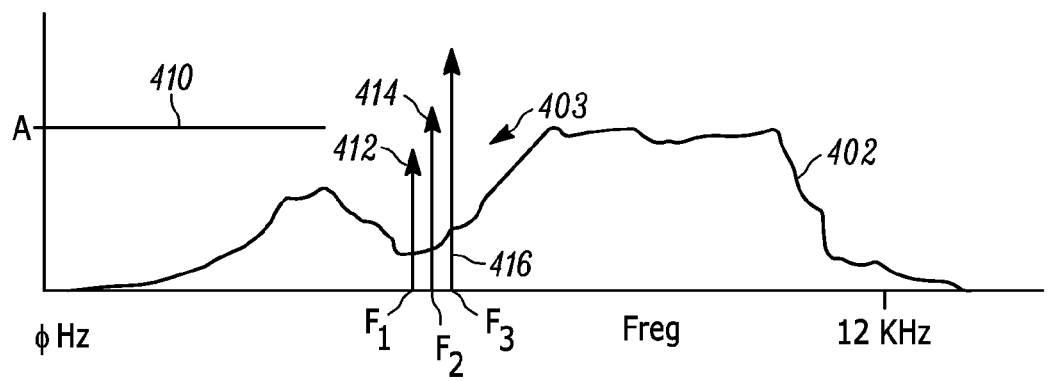

Referring again to FIGS. 4A and 4B, the frequencies in 4A identified by reference numerals 404, 406 and 408 produce a tonal pattern at or within the notch 403 of the ambient noise level. In FIG. 4B however, three different audio frequencies 412, 414 and 416 are generated in the same notch 403 but the tonal qualities of the different amplitudes at different frequencies will have a distinctively different sound to them. The control computer 120 in a leading vehicle thus generates the announcing sound identified by the frequency components shown in FIG. 4A whereas a trailing vehicle generates a different announcing sound represented by the frequency components identified by reference numerals 412, 414 and 416 in FIG. 4B. A train or caravan of quiet vehicles can thus announce the beginning and end of the train by using distinctive tonal signals and adjusting those signals according to the impairment of the drivers in the quiet vehicles.

In the preferred embodiment, program instructions stored in the memory device 204 cause the computer 202 to generate audio frequency signals 404, 406, 408 and 412, 414 and 416, which are "located" in the relative "pass band" or notch 403 between F1 and F3. The generated noise signals are provided with amplitudes 410 that are at least as large as the ambient noise level at their respective frequencies. The computer-generated frequency components 404, 406, 408 and 412, 414, 416 will thus be more distinguishable or identifiable from ambient noise 402 because they are tuned to a portion of the audio frequency spectrum, i.e., the notch 403, where ambient noise components are lowest, relative to other signals between zero and about twelve-thousand Hertz.

In the alternate embodiment, wherein music or other audio is obtained from the vehicle memory 204 and generated as "noise" the amplitude of such noise is made to be at least as great as the amplitude of the ambient noise. In view of the foregoing and for the sake of completeness and clarity, noise should be construed to include any and all forms and types of audio signals, generated by or emitted from a quiet vehicle to announce its presence or approach, including the sound emitted from the vehicle's horn.

Those of ordinary skill in the art will recognize the safety improvements realized by announcing a train or caravan of quiet vehicles approaching or moving past pedestrians or other vehicles. The true scope of the invention however is set forth in the following claims.

What is claimed is:

1. A method of announcing the presence of a plurality of moving quiet vehicles, which are proximate to each other as they move, the method comprising:
   determining characteristics of the vehicles proximate to each other;
   establishing wireless communications between a plurality of the quiet vehicles proximate to each other;
   reading information from a plurality of driver vital sign sensors;
   reading vehicle control sensors;
   determining a state of mind or physical state of a driver of at least one vehicle using information read from the driver vital sign sensors and the vehicle control sensors;
   forwarding to quiet vehicles that are proximate to each other, at least one of:
      the determined state of mind or physical state of a driver and,
      information from the driver vital sign sensors and the vehicle control sensors; and
   generating noise from at least one quiet vehicle, the generated noise being audible to at least pedestrians proximate to the quiet vehicles, characteristics of the generated noise being selected from a plurality of different characteristics responsive to the positions of the quiet vehicles relative to each other, ambient noise and the audible operating noise produced by each quiet vehicle as it moving, and the generated noise having characteristics selected from a plurality of different characteristics responsive to the determined states of mind or physical states of the drivers of a plurality of the quiet vehicles.

2. The method of claim 1, wherein the determined states of mind or physical states of drivers is provided to other vehicles of the vehicles proximate to each other via a wireless transmission and wherein the step of generating noise having characteristics selected from a plurality of different characteristics responsive to the determined state of mind or physical state of the driver of at least one vehicle further comprises, generating noise from a first vehicle responsive to the determined state of mind or physical state of a driver of a second vehicle.

3. The method of claim 1, wherein the step of generating noise from at least one vehicle, responsive to the positions of the vehicles relative to each other, ambient noise and the audible operating noise produced by each vehicle as it moving, further comprises:
   determining a leading vehicle and a trailing vehicle from the plurality of vehicles;
   generating a first type of noise from the leading vehicle; and
   generating a second type of noise from the trailing vehicle.

4. The method of claim 3, further comprising:
   generating a third type of noise from a vehicle between the leading vehicle and the trailing vehicle.

5. The method of claim 4, wherein the third type of noise is substantially silence.

6. An apparatus for announcing the presence of a quiet moving vehicle, which moves with a plurality of other quiet vehicles, the apparatus comprising:
   a vehicle-to-vehicle transceiver, configured to provide point-to-point wireless communications between quiet vehicles, the point-to-point wireless communications taking place over distances up to about five hundred feet;
   a plurality of driver condition sensors, configured to detect and provide information-bearing signals in real time regarding mental and physical conditions of a driver of the vehicle;
   a plurality of vehicle control sensors, each sensor configured to provide signals representing the driver's operation of a corresponding vehicle operation control device;
   a computer coupled to the vehicle-to-vehicle transceiver, the driver condition sensors and the vehicle control sensors;
   a noise generator, configured to generate a noise having characteristics, selected from a plurality of different characteristics responsive to the mental and physical condition of the driver and responsive to positions of the vehicles relative to each other, ambient noise and the audible operating noise produced by each vehicle as it moving.

7. The apparatus of claim 6, further comprising a non-transitory memory device coupled to the computer, the non-transitory memory device storing executable program instructions, which when executed cause the computer to:
   read information from a plurality of driver vital sign sensors in real time;
   read information from a plurality of vehicle control sensors in real time;
   determine a state of mind or physical state of a driver of at least one vehicle using information read from the driver vital sign sensors and the vehicle control sensors;
   forward to quiet vehicles that are proximate, at least one of the determined state of mind or physical state of a driver and, the information from the driver vital sign sensors and the vehicle control sensors; and
   generate noise from at least one quiet vehicle, the generated noise having characteristics selected from a plurality of different characteristics responsive to the determined states of mind or physical states of the drivers of a plurality of the quiet vehicles.

8. The apparatus of claim 7, wherein the non-transitory memory device stores a plurality of sounds.

9. The apparatus of claim 6, wherein the plurality of driver condition sensors comprise a pedestrian sensor, configured to detect a pedestrian, a distance between the pedestrian and the vehicle and, a direction the pedestrian is facing.

* * * * *